(12) United States Patent
Nilsson et al.

(10) Patent No.: US 10,470,190 B2
(45) Date of Patent: Nov. 5, 2019

(54) METHOD AND NETWORK NODE FOR ADAPTING CAPACITY TO CAPACITY NEED

(71) Applicant: Telefonaktiebolaget LM Ericsson (publ), Stockholm (SE)

(72) Inventors: Andreas Nilsson, Göteborg (SE); Martin Johansson, Mölndal (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 170 days.

(21) Appl. No.: 15/310,531

(22) PCT Filed: May 12, 2014

(86) PCT No.: PCT/EP2014/059675
§ 371 (c)(1),
(2) Date: Nov. 11, 2016

(87) PCT Pub. No.: WO2015/172812
PCT Pub. Date: Nov. 19, 2015

(65) Prior Publication Data
US 2017/0086201 A1    Mar. 23, 2017

(51) Int. Cl.
*H04W 72/04* (2009.01)
*H04W 72/12* (2009.01)
(Continued)

(52) U.S. Cl.
CPC ...... *H04W 72/0486* (2013.01); *H01Q 1/2291* (2013.01); *H04B 17/12* (2015.01);
(Continued)

(58) Field of Classification Search
CPC .............. G06K 19/07749; H01Q 9/26; H04W 36/0083; H04W 72/1252; H04W 88/10; H04W 24/00
See application file for complete search history.

(56) References Cited

U.S. PATENT DOCUMENTS 5,039,995 A    8/1991  Hulbert
5,189,432 A    2/1993  Lombardi et al.
(Continued)

FOREIGN PATENT DOCUMENTS

EP    0322109 A2    6/1989
WO    2010115467 A1    10/2010
(Continued)

OTHER PUBLICATIONS

International Search Report and Written Opinion dated Mar. 3, 2015 in International application No. PCT/EP2014/059675, 9 pages.

*Primary Examiner* — Raj Jain
(74) *Attorney, Agent, or Firm* — Rothwell, Figg, Ernst & Manbeck, P.C.

(57) ABSTRACT

A method for increasing throughput of an indoor communication network, and a system executing the method are disclosed. The method comprises establishing a first capacity parameter reflecting a first capacity need within a first area covered by a first antenna unit, establishing a second capacity parameter reflecting a second capacity need within a second area covered by a second antenna unit, and adopting impedances of the first and second antenna units based on the established first and second capacity parameters.

20 Claims, 4 Drawing Sheets

(51) Int. Cl.
*H04W 16/08* (2009.01)
*H04W 88/08* (2009.01)
*H04W 36/00* (2009.01)
*H04W 52/34* (2009.01)
*H04B 17/12* (2015.01)
*H01Q 1/22* (2006.01)

(52) U.S. Cl.
CPC ....... *H04W 16/08* (2013.01); *H04W 36/0083* (2013.01); *H04W 52/34* (2013.01); *H04W 72/042* (2013.01); *H04W 72/0413* (2013.01); *H04W 72/1252* (2013.01); *H04W 88/085* (2013.01)

(56) References Cited

U.S. PATENT DOCUMENTS

| | | | | |
|---|---|---|---|---|
| 7,750,864 | B2 * | 7/2010 | Hilgers | G06K 19/07749 343/700 MS |
| 9,648,502 | B2 * | 5/2017 | Carey | H04W 16/18 |
| 2004/0053634 | A1 * | 3/2004 | Gainey | H01Q 1/125 455/522 |
| 2008/0123520 | A1 * | 5/2008 | Ji | H04W 72/1252 370/216 |
| 2011/0109524 | A1 * | 5/2011 | Saily | H01Q 21/08 343/893 |
| 2017/0086201 | A1 * | 3/2017 | Nilsson | H04W 16/08 |

FOREIGN PATENT DOCUMENTS

| | | |
|---|---|---|
| WO | 2014053149 A1 | 4/2014 |
| WO | 2015106831 A1 | 7/2015 |

\* cited by examiner

METHOD AND NETWORK NODE FOR ADAPTING CAPACITY TO CAPACITY NEED

CROSS-REFERENCE TO RELATED APPLICATION(S)

This application is a 35 U.S.C. § 371 National Phase Entry Application from PCT/EP2014/059675, filed May 12, 2014, and designating the United States.

TECHNICAL FIELD

The technology disclosed herein relates generally to the field of distributed antenna systems, and in particular to a method and network node for adapting capacity to capacity need within such distributed antenna systems.

BACKGROUND

A large part of the traffic load in future wireless communication systems is expected to originate from indoor users, for example from users in office buildings, cafés, shopping malls etc. Providing the indoor users with high bit-rate and spectrally efficient communication from outdoor base stations is challenging due to the penetration loss that is experienced by signals propagating through building walls. One way of enhancing the indoor coverage is to deploy an indoor radio base station (RBS) and connect it to a distributed antenna system (DAS) where a discrete set of antennas located indoors and close to the users are used for providing coverage.

The amount of wireless traffic within e.g. a building or a train station deploying such DAS varies over time, and may be more intense at certain locations within the DAS coverage, while being low at others. For instance, at lunch time the traffic load may be very high at food courts located within the DAS coverage while being much lower at office spaces. Such dynamic changes of traffic load may be easy enough to predict, but hard to adapt to in terms of capacity and throughput. It would be desirable to increase the throughput of an indoor communication system and to meet the varying capacity need within such system.

SUMMARY

An object of the present disclosure is to solve or at least alleviate at least one of the above mentioned problems.

The object is according to a first aspect achieved by a method in a network node of a wireless network for adapting capacity to capacity need. The wireless network comprises a distributed antenna system providing coverage for wireless communication for communication devices, wherein the distributed antenna system comprises two or more antenna units connected to the network node and each antenna unit providing coverage of a respective area. The method comprises: establishing a respective capacity parameter reflecting a capacity need within a respective area of at least two areas within the distributed antenna system, wherein a first area is covered by a first antenna unit and a second area is covered by a second antenna unit; and adapting an impedance of the two or more antenna units based on the established capacity parameters for each respective areas.

An advantage provided by the method is that it enables adaptation to the varying capacity need within the distributed antenna system such as to increase the capacity and also throughput at "hotspots", i.e. at locations within the coverage of the distributed antenna system having high amount of traffic.

The object is according to a second aspect achieved by a network node of a wireless network for adapting capacity to capacity need. The wireless network comprises a distributed antenna system providing coverage for wireless communication for communication devices, wherein the distributed antenna system comprises two or more antenna units connected to the network node and each antenna unit providing coverage of a respective area. The network node comprises a processor and a memory storing instructions that, when executed by the processor, causes the network node to: establish a respective capacity parameter reflecting a capacity need within a respective area of at least two areas within the distributed antenna system, wherein a first area is covered by a first antenna unit and a second area is covered by a second antenna unit; and adapt an impedance of the two or more antenna units based on the established capacity parameters for each respective areas.

The object is according to a third aspect achieved by a computer program for a network node of a wireless network for adapting capacity to capacity need. The wireless network comprises a distributed antenna system providing coverage for wireless communication for communication devices, wherein the distributed antenna system comprises two or more antenna units connected to the network node and each antenna unit providing coverage of a respective area. The computer program comprises computer program code, which, when run on the network node causes the network node to: establish a respective capacity parameter reflecting a capacity need within a respective area of at least two areas within the distributed antenna system, wherein a first area is covered by a first antenna unit and a second area is covered by a second antenna unit, and adapt an impedance of the two or more antenna units based on the established capacity parameters for each respective areas.

The object is according to a fourth aspect achieved by a computer program product comprising a computer program as above, and a computer readable means on which the computer program is stored.

The object is according to a fifth aspect achieved by network node of a wireless network for adapting capacity to capacity need. The wireless network comprises a distributed antenna system providing coverage for wireless communication for communication devices, wherein the distributed antenna system comprises two or more antenna units connected to the network node and each antenna unit providing coverage of a respective area. The network node comprises first means for establishing a respective capacity parameter reflecting a capacity need within a respective area of at least two areas within the distributed antenna system, wherein a first area is covered by a first antenna unit and a second area is covered by a second antenna unit; and second means for adapting an impedance of the two or more antenna units based on the established capacity parameters for each respective areas.

Further features and advantages of the present disclosure will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

A problem with existing solutions, identified by the inventors of the present disclosure, is that the impedance of antennas (including matching components) of a distributed antenna system (DAS) is static along a radio frequency (RF) cable by means of which the antennas are connected to a network node, which means that the radiated and absorbed power of the antennas connected along the cable is static. However, the wireless traffic changes dynamically over time which leads to sub-optimal antenna radiation properties along the DAS with respect to a current traffic distribution.

Figure 1:
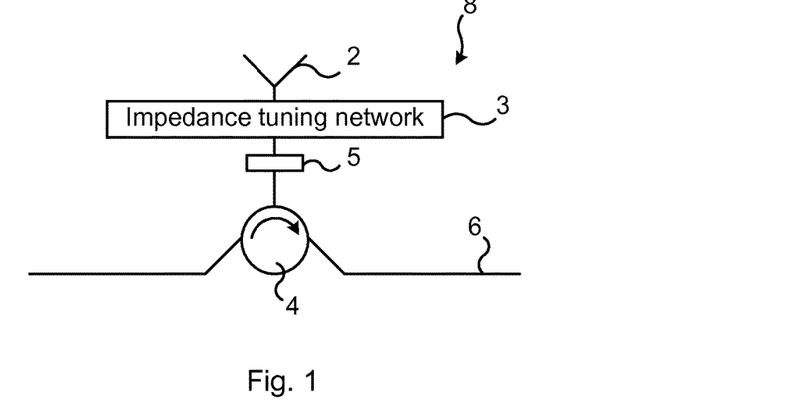
FIG. 1 illustrates schematically an aspect of the present disclosure.

FIG. 1 illustrates schematically an aspect of the present disclosure for overcoming this. Briefly, in an aspect, the power radiated and absorbed at different antennas of antenna units of a DAS is dynamically adapted by changing the impedance of the individual antennas. Thereby the energy may be focused where it is needed according to the current traffic distribution. One such antenna unit 8 is illustrated in FIG. 1. The antenna unit 8 comprises an impedance tuning network 3, connected to an antenna 2 radiating and receiving radio frequency signals. The antenna 2 may comprise any type of antenna elements. The impedance tuning network 3 may comprise an electronically tunable impedance unit, which in turn may comprise components such as micromechanical switches (MEMS) switches to change the impedance, and components such as inductances and capacitances which can be switched on or off to match the impedance of the antenna unit 8 with the impedance of the cable 6 to varying degree. If the impedance of the antenna unit 8 is completely matched to the impedance of the cable 6, all energy of a signal sent over the cable 6 would be radiated by the antenna 2, and if mismatched to a certain degree, only part of the energy is radiated by the antenna 2.

The impedance tuning network 3 may be connected to a control device 5 or the impedance tuning network 3 may comprise such control device 5 (i.e. the control device 5 may be an integral part of the impedance tuning network). The control device 5, whether or not being a separate unit, is configured to receive control signaling from a network node (not illustrated in FIG. 1), and to control the impedance tuning network 3 accordingly. The control device 5 may thus control the switching of the various impedance matching components of the impedance tuning network 3. The control device 5 may for example comprise a processor or processor circuitry. The antenna unit 8 is connected to a cable 6, e.g. a coaxial cable, via a circulator 4. The circulator 4 may thus be connected to the control device 5 or directly to the impedance tuning network 3.

Figure 2:
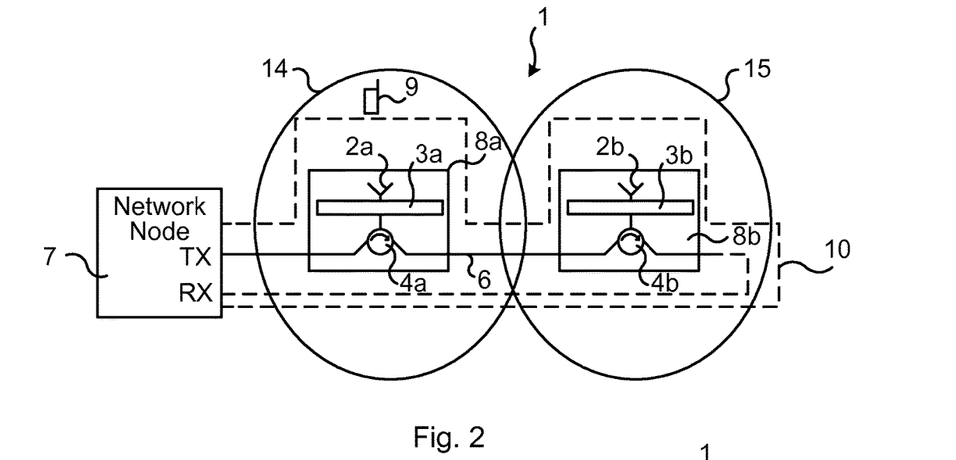
FIG. 2 illustrates schematically an environment in which embodiments of the present disclosure may be implemented, and in particular a first embodiment.

FIG. 2 illustrates schematically an environment in which embodiments of the present disclosure may be implemented, and in particular a first embodiment. A wireless network 1 enabling wireless communication for a number of communication devices 9 residing within its coverage area is illustrated. The wireless network 1 comprises one or more network nodes 7 (only one illustrated). The network node 7 is configured to control a number of antenna units 8a, 8b (two in the illustrated case), which constitute a distributed antenna system (DAS) 10. The antenna units 8a, 8b comprise antennas 2a, 2b receiving wireless signals (radio frequency signals) from the communication devices 9 and transmitting signals to them, thus enabling the wireless communication. The DAS 10 thus comprises a number of antenna units 8a, 8b which may be daisy-chained using circulators 4a, 4b connected to the same single feeder line, i.e. cable 6. The circulators 4a, 4b may be three-port circulators and is a passive device, in which an RF signal entering any port is transmitted to the next port in rotation. In the figure, the rotation direction is indicated in conventional manner by an arrow. It is noted that although only two antenna units are illustrated and described, the DAS 10 may comprise any number of antenna units. It is further noted that the circulators may be configured in different ways to the cable 6, i.e. the ports of the circulators can be connected in different ways to the cable 6 for providing a desired signal transfer direction.

Each antenna unit 8a, 8b is tuned such as each corresponding circulator 4a, 4b passes a certain amount of energy to the antenna unit with which it is interconnected. In particular, RF energy sent along the cable 6 reaches one port of a circulator and is passed to the next port thereof. Each antenna unit 8a, 8b is mismatched to the cable 6 in view of impedance, so that only a configured amount of the energy is radiated by its antenna 2a, 2b. That is, taking the leftmost antenna unit 8a of FIG. 2 as an example: if it were perfectly impedance matched to the transmission line (i.e. the cable 6) it would radiate all energy that it receives from the network node 7 in downlink and the desired coverage would not be obtained since the second antenna unit 8b would receive no energy at all. The antenna units 8a, 8b are hence mismatched, providing a desired fraction of the incident power to be transmitted/received by a respective antenna 2a, 2b. The antenna units 8a, 8b are connected to the feeder line (i.e. cable 6) using the impedance tuning network 3a, 3b thereof as a means to control the amount of power radiated per antenna unit. The mismatch may be controlled in a dynamic manner, by dynamically adapting the impedance of the antenna units 8a, 8b to be mismatched to the impedance of the cable 6 according to current traffic distribution need.

The DAS 10 may be fed from both ends of the cable 6, which is connected to the network node 7, and in particular to a respective antenna port of the network node 7. When feeding the cable 6, signals are transmitted from the network node 7 through the cable 6 and transmitted by the antenna units 8a, 8b, whereby the signals may be received by communication devices 9 located within coverage area of the network node 7. The feeding of the cable is thus a downlink direction, from the network node 7 to communication devices 9. When sensing the cable 6, signals sent by communication devices 9 are received by means of the antenna units 8a, 8b and conveyed over the cable 6 to the network node 7. The sensing of the cable 6 is thus an uplink direction, from the communication device 9 to the network node 7.

Still with reference to FIG. 2, the illustrated DAS 10 is a single-fed DAS (circulators 4a, 4b are directed to pass energy received in the same direction only). Each antenna unit 8a, 8b covers a respective area 14, 15, and each antenna unit 8a, 8b has an impedance tuning network 3a, 3b controlling its impedance matching. The network node 7 may decide the impedance settings for the different antenna units 8a, 8b, and signals for controlling the impedance matching may be transmitted on the same cable 6 as the RF signals.

It is noted that in some embodiments a single cable is provided. In particular, the cable 6 of FIG. 2 may end after the rightmost antenna unit 8b and corresponding circulator 4b. This is illustrated schematically by the cable 6 being indicated by a dashed line after this circulator 4b. The signal energy transferred from the rightmost circulator 4b is then reflected at the end of the cable (the cable ending at the start of the dashed line) and be passed to the network node 7 (via also the leftmost circulator 4a).

A particular numerical example is given in the following, for a single-fed DAS 10 with a coaxial cable 6 and two antenna units 8a, 8b as illustrated in FIG. 2. In this example, the nominal impedance matching of each antenna unit 8a, 8b is such that the return loss (S11) is −0.45 dB, which means that 10% of the energy fed/received to the antenna units is radiated/absorbed and the rest is reflected (i.e. circulated by the circulators 4a, 4b). Assuming for example that the coverage area 14 to the left in the figure, covered by the first antenna unit 8a, is a dining room and that during lunch time most of the wireless traffic is located in that area 14. It could then be beneficial to improve the impedance matching of the first antenna unit 8a covering the dining room in order to increase the capacity there. For example, letting the impedance matching of that antenna unit 8a decrease the return loss to −3 dB, which means that 50% of the energy fed/received to the first antenna unit 8a is radiated/absorbed and 50% is reflected. This means that the signal to noise ratio (SNR) in uplink and downlink will increase with 7 dB in the dining room. The SNR in downlink will decrease with about 2.5 dB in the coverage area 15 served by the second antenna unit 8b (rightmost antenna unit covering area 15) due to the extra radiated energy of the first antenna unit 8a, and thus less energy left to be circulated by circulator 4a to the second antenna unit 8b; however, if most of the traffic is located in the dining room, the total performance of the wireless network 1 is still increased.

The tuning of the impedance of the antenna units 8a, 8b may be performed in different time scales, for example on millisecond-, second-, minute-, or hour-basis. If the impedance tuning is quick, for example in millisecond- or second-basis, a method for calculating the position of the communication devices 9 along the DAS 10 is preferably implemented in the network node 7. By determining the positions of the communication devices 9 within the area covered by the DAS 10 and knowing where the antenna units 8a, 8b of the DAS 10 are located it is possible to figure out which antenna unit 8a, 8b is connecting with which communication device 9. Then the impedance matching may be improved for the antenna unit that is connected to an active communication device 9 in order to increase the signal quality, e.g. the signal to interference plus noise ratio (SINR), for this communication device 9 in both uplink and downlink. A detailed knowledge of the positions of the communication devices 9 may not be required; In fact, knowing which antenna unit 8a, 8b of the DAS 10 that best serves each communication device 9 may suffice.

There are different ways to find out where the communication devices 9 are located along the DAS 10. For example if the DAS 10 is fed/sensed in both ends of the cable 6 from the same network node 7, the time difference between the signals in respective RX port could be used to find out where along the DAS 10 the communication devices 9 are located. Since the positions of the antenna units in the DAS 10 are known, it is then straightforward to calculate which antenna unit 8a, 8b the respective communication devices 9 are connected to.

Figure 3:
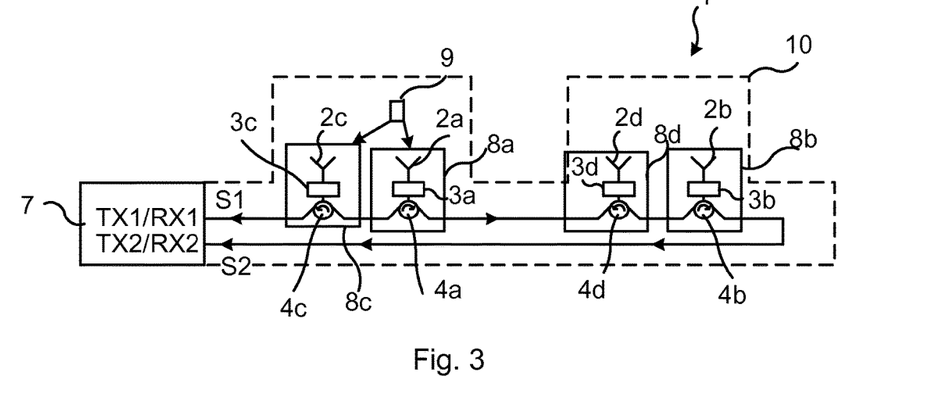
FIG. 3 illustrates schematically an environment in which embodiments of the present disclosure may be implemented, and in particular a second embodiment.

An example of this is illustrated in FIG. 3, schematically illustrating an environment in which embodiments of the present disclosure may be implemented, and in particular a second embodiment. In this embodiment, the DAS 10 comprises four antenna units, each comprising a respective impedance tuning network 3a, 3b, 3c, 3d and antenna 2a, 2b, 2c, 2d. Each antenna unit is connected to the cable 6 by means of a respective circulator 4a, 4b, 4c, 4d. From left to right in the figure, the DAS 10 comprises a third antenna unit 8c comprising third impedance tuning network 3c and third antenna 2c, a first antenna unit 8a comprising first impedance tuning network 3a and first antenna 2a, a fourth antenna unit 8d comprising fourth impedance tuning network 3d and fourth antenna 2d and a second antenna unit 8b comprising second impedance tuning network 3b and second antenna 2b. As illustrated by the respective arrows of the respective circulators 4a, 4b, 4c, 4d, the circulators are configured to convey the received energy to a first antenna port (indicated by TX1/RX1) or a second antenna port (indicated by TX2/RX2) of the network node 7. In particular, the third and fourth circulators conveys received energy to the first antenna port, while the first and second circulators conveys received energy to the second antenna port.

A communication device 9 transmits a signal that is absorbed by the first and third antennas 2a, 2c. A first part S1 of the absorbed signal is transferred to the first antenna port (in particular the receiving circuitry, RX1, thereof), as indicated by the third circulator 4c, and a second part S2 of the absorbed signal is transferred to the second antenna port (in particular to the receiving circuitry, RX2, thereof), as indicated by the first circulator 4a. By measuring the time difference between these two signals S1, S2 the location of the communication device 9 along the DAS 10 can be obtained. One way of finding the time difference between S1 and S2 is to analyze the uplink reference signals transmitted by the communication device 9. The larger the frequency bandwidth on which the uplink reference signals are sent is the better resolution in space.

A second way is to measure the difference in received signal strength between the signals S1 and S2 and using the known attenuation along the cable 6 to find the position of the communication device 9. That is, the network node 7 receives the first part S1 of the absorbed signal, and determines the signal strength thereof, taking into account the attenuation of the cable 6 and the (shorter) cable length between the third antenna unit 8c and the network node 7. Correspondingly, the network node 7 receives the second part S2 of the absorbed signal, and determines the signal strength thereof, taking into account the attenuation of the cable 6 and the (longer) cable length between the first antenna unit 8a and the network node 7. The network node 7 is also aware of the impedance settings of all the antenna units 8a, 8b, 8c, 8d and based on all this information the network node 7 is able to calculate to which antenna unit the communication device 9 is closest to, i.e. within which antenna units' coverage area the communication device is residing. Performing this for all communication devices of the DAS 10, enables the network node 7 to establish a current traffic distribution, e.g. determining most of the communication devices 9 to reside within the coverage area of the first antenna unit 8a, which may prompt a capacity change so as to be able to provide best service to the communication devices 9. The impedance settings of the first antenna unit 8a would thus be changed such as to provide the most radiated/absorbed energy to this coverage area, as the most traffic is located there.

A third way to identify which antenna unit 8a, 8b, 8c, 8d in the DAS 10 that is primarily serving a communication device 9 is to change the impedance mismatch for each antenna unit in turn, and detect power control commands for the communication device 9. That is, the network node 7 may change the impedance settings for the first antenna unit 8a and in essence see how the communication device 9 responds to this: if the communication device 9 is indeed communicating via the first antenna unit 8a, and the network increases the mismatch for this antenna unit 8a, then the communication device 9 would presumable receive the signals with a weaker signal strength. The communication device 9 would then signal the need to increase transmission power to the network node 6. By altering the impedance settings for the antenna units one at a time, the network node 7 may thus use such information to establish via which antenna unit the communication device 9 is communicating.

The impedance matching may also be performed in slower time scales, for example on an hourly basis. In such case it is enough to know how the traffic distribution changes during the day. This knowledge could be obtained during installation of the DAS 10 or it could be found out during operation of the DAS 10 by testing different impedance settings and collect statistics. One example could be that during lunch time it is typically more traffic in a dining room and hence the impedance matching of the antenna element(s) covering the dining room could be improved during lunch hours. That is, the dynamic impedance matching may be based on historical information.

Figure 4:
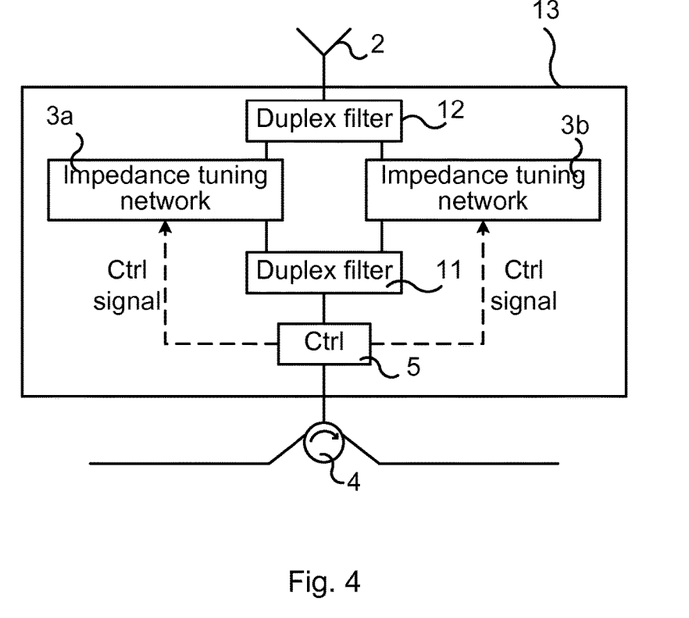
FIG. 4 is a circuit diagram of an impedance matching network in accordance with an aspect of the present disclosure.

FIG. 4 is a circuit diagram of an antenna unit 13 in accordance with an aspect of the present disclosure. In this embodiment, the active impedance matching settings can be defined individually for separate uplink and downlink frequencies. The antenna unit 13 comprises a control device 5, as described earlier (or is connected to a stand-alone control device). The antenna unit 13 comprises two impedance tuning networks 3a, 3b which may be controlled by the control device 5, as indicated by the dashed lines from the control device 5 to the impedance tuning networks 3a, 3b. The control device 5 is in turn controlled by the network node 7, in that it receives control signaling regarding the impedance settings from the network node 7. The signals received by the antenna unit 13 from the communication devices 9 (i.e. uplink signaling) and signals transmitted by the antenna unit 13 (i.e. downlink signaling from the network node 7) are applied by means of a respective duplexer, e.g. duplex filter 11, 12, to the impedance tuning networks 3a, 3b.

In this example, control signals are transmitted on the same cable 6 as the RF signals, although other means of control signaling is possible, for example on dedicated cables. This architecture gives the possibility to power balance the downlink and uplink signals.

Figure 5:
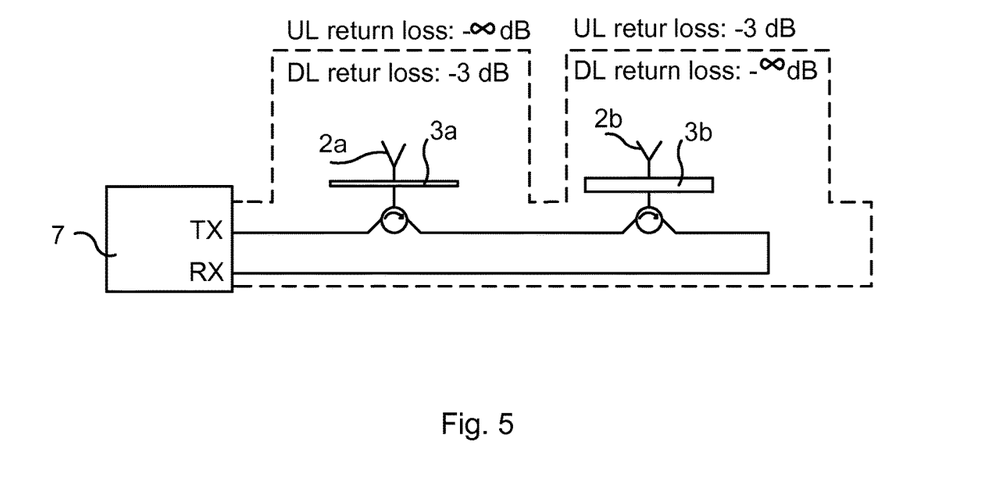
FIG. 5 illustrates schematically an environment in which embodiments of the present disclosure may be implemented.

With reference to FIG. 5, a numerical example of the above is given in the following for a DAS 10 comprising two antenna units (also compare FIG. 2). The loss in the cable 6 is neglected for simplicity. Assuming that half of the energy is to be transmitted on each antenna 2a, 2b, then the return loss would be −3 dB for the first antenna 2a (leftmost antenna in FIG. 5) and −∞ dB for the second antenna 2b (rightmost antenna in FIG. 5). However, if the impedance matching is the same in downlink and uplink this would cause all the uplink signals received at the first antenna 2a to be radiated at the second antenna 2b. By using different impedance matching for uplink and downlink it is possible to have for the first antenna 2a a return loss of −3 dB in downlink and −∞ dB in uplink and for the second antenna 2b −∞ dB in downlink and −3 dB in uplink. In this way the downlink and uplink signal power are perfectly balanced between the two antennas 2a, 3b.

Figure 6:
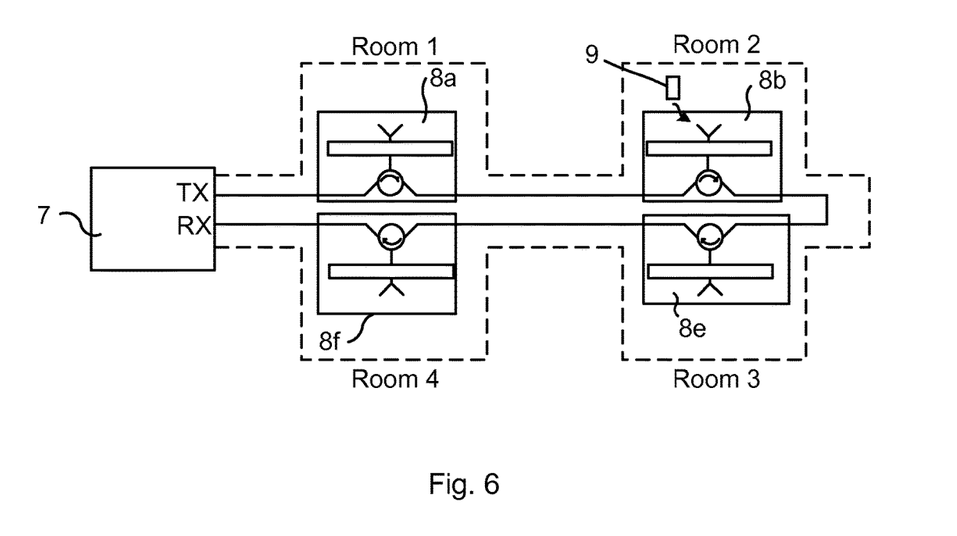
FIG. 6 illustrates schematically an environment in which embodiments of the present disclosure may be implemented.

FIG. 6 illustrates schematically an environment in which embodiments of the present disclosure may be implemented. As another numerical example, a single-fed DAS 10 is considered, the DAS 10 having a coaxial cable 6 and four antenna units 8a, 8b, 8e, 8f as illustrated in FIG. 6. Each antenna unit 8a, 8b, 8e, 8f provides coverage in a respective room: first antenna unit 8a in a first room (Room 1), second antenna unit 8b in a second room (Room 2), third antenna unit 8e in a third room (Room 3) and fourth antenna unit 8f in a fourth room (Room 4). The nominal impedance matching of each antenna unit is such that the return loss (S11) is −0.45 dB, which means that 10% of the energy fed/received to the antenna unit is radiated/absorbed and the rest is reflected. It is assumed that the positions of the communication device 9 could be found with short time interval, for example by changing the impedance matching of the antenna units and detecting power control commands for the communication devices (as described earlier). It is further assumed that an active communication device 9 is located in the second room (Room 2). By improving the impedance matching of the antenna unit 8b in that room such that the return loss is reduces to −3 dB would give an increase in Signal to noise ratio (SNR) with 7 dB in both uplink and downlink for the active communication device 9. The SNR will decrease with about 2.5 dB in DL for the third room (Room 3) and for the fourth room (Room 4) and with 2.5 dB in uplink for the first room (Room 1); however, as long as the active UE is indeed located in the second room, this it is not a problem.

In the following a further numerical example is given for illustrating the improvements provided by the present disclosure. Assuming again a single-fed DAS 10 with a coaxial cable 6 and four antenna units 8a, 8b, 8e, 8f as illustrated in FIG. 6. Assuming further that the traffic distribution changes over the day so that most of the traffic is located in the first room (Room1) during a first time period, TimePeriod1, in the second room (Room2) during a second time period, TimePeriod2 and so on. It may be desirable to change the impedance matching of the four antenna units 8a, 8b, 8e, 8f in the four rooms for the different time periods in order to increase the performance in the wireless network 1. Assuming further that the nominal impedance matching of each antenna unit 8a, 8b, 8e, 8f is such that the return loss (S11) is −0.45 dB, which means that 10% of the energy fed/received to the antenna unit 8a, 8b, 8e, 8f is radiated/absorbed and the rest is reflected. There are now for different scenarios:

1. TimePeriod1, improve the impedance matching in Room1:

Improve the return loss for antenna1 to −3 dB. This will give an increase in SNR in both uplink and downlink for the users in Room1 with 7 dB. For the users in Room2, Room3 and Room4 the SNR will be reduce in downlink with 2.5 dB and unchanged for the uplink.

2. TimePeriod2, improve the impedance matching in Room2:

Improve the return loss for antenna2 to −3 dB. This will give an increase in SNR in both uplink and downlink for the users in Room2 with 7 dB. For the users in Room1 the SNR will be unchanged in the downlink and reduced with 2.5 dB in the uplink. For the users in Room3 and Room4 the SNR will be reduce in downlink with 2.5 dB and unchanged for the uplink.

3. TimePeriod3, improve the impedance matching in Room3:

Improve the return loss for antenna3 to −3 dB. This will give an increase in SNR in both uplink and downlink for the users in Room3 with 7 dB. For the users in Room1 and Room2 the SNR will be unchanged in the downlink and reduced with 2.5 dB in the uplink. For the users in Room4 the SNR will be reduce in downlink with 2.5 dB and unchanged for the uplink.

4. TimePeriod4, improve the impedance matching in Room4:

Improve the return loss for antenna 4 to −3 dB. This will give an increase in SNR in both uplink and downlink for the users in Room4 with 7 dB. For the users in Room1, Room2 and Room3 the SNR will be unchanged in the downlink and reduced with 2.5 dB in the uplink.

Figure 7:
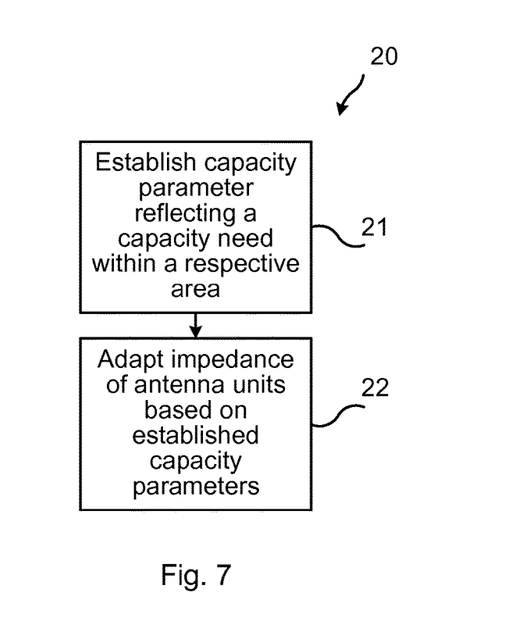
FIG. 7 illustrates a flow chart over steps of a method in a network node in accordance with the present disclosure.

FIG. 7 illustrates a flow chart over steps of a method 20 in a network node 7 in accordance with the present disclosure. The various features that have been described may be combined in different ways, examples of which are described next.

The method 20 may be implemented in a network node 7 of a wireless network 1, for example in a radio access node, for adapting capacity to capacity need. The wireless network 1 comprises a distributed antenna system 10 providing coverage for wireless communication for communication devices 9, wherein the distributed antenna system 10 comprises two or more antenna units 8a, 8b connected to the network node 7 and each antenna unit 8a, 8b providing coverage of a respective area 14, 15.

The method 20 comprises establishing 21 a respective capacity parameter reflecting a capacity need within a respective area 14, 15 of at least two areas 14, 15 within the distributed antenna system 10, wherein a first area 14 is covered by a first antenna unit 8a and a second area 15 is covered by a second antenna unit 8b. The capacity parameter may for example comprise the number of active communication devices 9 located within a respective area 14, 15. A higher number of active communication devices 9 requires a higher capacity need (e.g. in terms of radio resources), the capacity parameter comprising the number of active communication devices thus reflecting the capacity need.

The method 20 comprises adapting 22 an impedance of the two or more antenna units 8a, 8b based on the established capacity parameters for each respective areas 14, 15. The adapting 22 may for instance be effectuated by transmitting, to the two or more antenna units 8a, 8b, control signaling comprising impedance settings. The antenna units 8a, 8b may thereby change their impedance settings, e.g. their impedance mismatch, to more accurately meet the capacity need within their respective coverage area. By adapting the impedance settings of the antenna units, the power radiated and absorbed at the different antennas of the antenna units is changed and the radiated power may be directed according to need, i.e. according to a current traffic distribution.

In an embodiment, the establishing 21 comprises determining a respective number of active communication devices 9 located within a respective area 14, 15. By determining where (within the distributed antenna system 1) the active communication devices 9 are located, a current traffic distribution may be established for the distributed antenna system 1. The determination of where the active communication devices 9 are located can be made in various ways. A communication device 9 may be considered as an active communication device if it is associated or connected to a network node of the wireless network 1, or it may be considered as an active communication device if it is in such a operational mode as to require a traffic channel.

In a variation of the above embodiment, wherein the two or more antenna units 8a, 8b are connected to the network node 7 via a cable 6, the cable 6 being connected at a first end thereof to a first antenna port of the network node 7 and at a second end thereof to a second antenna port of the network node 7, the determining of where the active communication devices 9 are located comprises:

receiving, at the first and the second antenna ports of the network node 7, a signal from an active communication device 9, and determining, based on a time difference of reception of the signal at the respective antenna ports, the antenna unit 8a, 8b to which the active communication device 9 is connected, and repeating the receiving and determining for each active communication device 9, whereby the respective number of active communication devices 9 located within a respective area 14, 15 is determined.

That is, if the distributed antenna system 1 is fed/sensed at both ends of the cable 6, the time difference between the signals received in a respective reception antenna port of the network node 7 may be determined. The positions of the antenna units 8a, 8b within the distributed antenna system are known and also the cable length to each antenna unit, whereby the location of the active communication device can be determined (also compare FIG. 3 and related description).

In another variation, wherein the two or more antenna units 8a, 8b are connected to the network node 7 via a cable 6, the cable 6 being connected at a first end thereof to a first antenna port of the network node 7 and at a second end thereof to a second antenna port of the network node 7, the determining of where the active communication devices 9 are located comprises:

receiving, at the first and second antenna ports of the network node 7, a signal from an active communication device 9, determining, based on a difference in received signal strength between the signal as received at the respective antenna ports, the antenna unit 8a, 8b to which the active communication device 9 is connected, and repeating the receiving and determining for each active communication device 9, whereby the respective number of active communication devices 9 located within a respective area 14, 15 is determined.

In a way corresponding to the above time difference between the signal received at the respective antenna ports, the difference in received signal strength between the signal at the respective antenna ports may be used for determining where along the cable 6 an active communication device 9 is located.

In still another variation, the determining of where the active communication devices 9 are located comprises:
- determining the antenna unit 8a, 8b to which an active communication device 9 is connected by changing, in turn, the impedance for each respective antenna unit 8a, 8b and detecting transmission power changes for the active communication device 9 in response to the impedance change, and
- repeating the determining for each active communication device 9, whereby the respective number of active communication devices 9 located within a respective area 14, 15 is determined.

In a variation of the above embodiment, an antenna unit 8a, 8b for which an active communication device 9 lowers its transmission power for a reduced impedance mismatch or increases its transmission power for an increased impedance mismatch is determined to be serving the active communication device 9, the active communication device 9 thus being located within the area 14, 15 covered by this antenna unit 8a, 8b. For an antenna unit having a perfect impedance matching to the impedance of the cable, all power is radiated through the corresponding antenna element(s). By increasing the impedance mismatch for a particular antenna unit, the less energy is radiated through its antenna element(s). An active communication device communicating through this antenna unit would then receive a reduced signal strength and increase its transmission power. Thus, by detecting, in the network node, power control commands for a particular active communication device its location within the distributed antenna system 1 can be determined.

In an embodiment, the establishing 21 of a respective capacity parameter reflecting a capacity need comprises determining, based on historical data for the respective capacity parameter, changes of capacity need within each respective area 14, 15 over a time period. The current traffic distribution may thus be established based on historical data, i.e. based on knowledge on how the communication devices are typically moving within the distributed antenna system during e.g. a day.

In an embodiment, the adapting 22 comprises dynamically changing the impedance of an impedance tuning network 3a, 3b, 3c, 3d of each respective antenna unit 8a, 8b, 8c, 8d thereby adapting the power radiated and absorbed at the respective antenna units 8a, 8b, 8c, 8d.

In an embodiment, the adapting 22 comprises adapting the impedance individually for an uplink direction and downlink direction, respectively.

Figure 8:
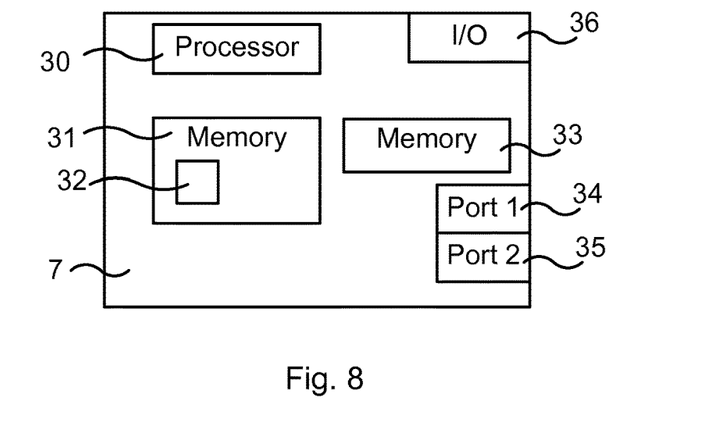
FIG. 8 illustrates schematically a network node and means for implementing methods of the present disclosure.

FIG. 8 illustrates schematically a network node 7 and means for implementing embodiments of the method of the present disclosure. The network node 7 may comprise an input/output device 36 (I/O) constituting an interface for communication exchange with e.g. other network nodes within the wireless network 1. The network node 7 may comprise antenna ports 34, 35 (Port 1, Port 2) for receiving/transmitting signaling to communication devices residing within the coverage of antenna units controlled by the network node 7.

The network node 7 comprises a processor 30 comprising any combination of one or more of a central processing unit (CPU), multiprocessor, microcontroller, digital signal processor (DSP), application specific integrated circuit etc. capable of executing software instructions stored in a memory 31, which can thus be a computer program product 31. The processor 30 can be configured to execute any of the various embodiments of the method as described for example in relation to FIG. 7.

In particular, a network node 2 of a communication system 1 is provided for adapting capacity to capacity need. The network node 7 may comprise a radio access node of a wireless network 1, the wireless network 1 comprising a distributed antenna system 10 providing coverage for wireless communication for communication devices 9, wherein the distributed antenna system 10 comprises two or more antenna units 8a, 8b connected to the network node 7 and each antenna unit 8a, 8b providing coverage of a respective area 14, 15. The network node 7 thus comprises a processor 30; and a memory 31 storing instructions that, when executed by the processor 30, causes the network node 7 to:
- establish a respective capacity parameter reflecting a capacity need within a respective area 14, 15 of at least two areas 14, 15 within the distributed antenna system 10, wherein a first area 14 is covered by a first antenna unit 8a and a second area 15 is covered by a second antenna unit 8b, and
- adapt an impedance of the two or more antenna units 8a, 8b based on the established capacity parameters for each respective areas 14, 15.

In an embodiment, the network node 7 is operative to establish by determining a respective number of active communication devices 9 located within a respective area 14, 15.

In a variation of the above embodiment, wherein the two or more antenna units 8a, 8b are connected to the network node 7 via a cable 6, the cable 6 being connected at a first end thereof to a first antenna port of the network node 7 and at a second end thereof to a second antenna port of the network node 7, the network node 7 is operative to determine by:
- receiving, at the first and the second antenna ports of the network node 7, a signal from an active communication device 9, and
- determining, based on a time difference of reception of the signal at the respective antenna ports, the antenna unit 8a, 8b to which the active communication device 9 is connected, and
- repeating the receiving and determining for each active communication device 9, whereby the respective number of active communication devices 9 located within a respective area 14, 15 is determined.

In another variation, wherein the two or more antenna units 8a, 8b are connected to the network node 7 via a cable 6, the cable 6 being connected at a first end thereof to a first antenna port of the network node 7 and at a second end thereof to a second antenna port of the network node 7, the network node 7 is operative to determine by:
- receiving, at the first and second antenna ports of the network node 7, a signal from an active communication device 9,
- determining, based on a difference in received signal strength between the signal as received at the respective antenna ports, the antenna unit 8a, 8b to which the active communication device 9 is connected, and
- repeating the receiving and determining for each active communication device 9, whereby the respective number of active communication devices 9 located within a respective area 14, 15 is determined.

In still another variation, the network node 7 is operative to determine by:
- determining the antenna unit 8a, 8b to which an active communication device 9 is connected by changing, in turn, the impedance for each respective antenna unit 8a, 8b and detecting transmission power changes for the active communication device 9 in response to the impedance change, and repeating the determining for each active communication device 9, whereby the respective number of active communication devices 9 located within a respective area 14, 15 is determined.

In a variation of the above embodiment, the network node 7 is operative to determine an active communication device 9 to be served by an antenna unit 8a, 8b for which the active communication device 9 lowers its transmission power for a reduced impedance mismatch or increases its transmission power for an increased impedance mismatch, the active communication device 9 thus being located within the area 14, 15 covered by this antenna unit 8a, 8b.

In an embodiment, the network node 7 is operative to establish a respective capacity parameter reflecting a capacity need by determining, based on historical data for the respective capacity parameter, changes of capacity need within each respective area 14, 15 over a time period.

In an embodiment, the network node 7 is operative to adapt by dynamically changing the impedance of an impedance tuning network 3a, 3b, 3c, 3d of each respective antenna unit 8a, 8b, thereby adapting the power radiated and absorbed at the respective antenna units 8a, 8b.

In an embodiment, the network node 7 is operative to adapt by adapting the impedance individually for an uplink direction and downlink direction, respectively.

Still with reference to FIG. 8, the memory 31 can be any combination of read and write memory (RAM) and read only memory (ROM). The memory 31 also comprises persistent storage, which, for example, can be any single one or combination of magnetic memory, optical memory, solid state memory or even remotely mounted memory.

A data memory 33 may also be provided for reading and/or storing data during execution of software instructions in the processor 30. The data memory 33 can be any combination of read and write memory (RAM) and read only memory (ROM).

The present disclosure also encompasses a computer program product 31 comprising a computer program 32 for implementing the embodiments of the method as has been described, and a computer readable means on which the computer program 32 is stored. The computer program product 31 may be any combination of read and write memory (RAM) or read only memory (ROM). The computer program product 31 may also comprise persistent storage, which for example can be any single one or combination of magnetic memory, optical memory or solid state memory.

The present disclosure thus comprise a computer program 32 for a network node 7 of a wireless network 1 for adapting capacity to capacity need, the wireless network 1 comprising a distributed antenna system 10 providing coverage for wireless communication for communication devices 9, wherein the distributed antenna system 10 comprises two or more antenna units 8a, 8b connected to the network node 7 and each antenna unit 8a, 8b providing coverage of a respective area 14, 15. The computer program 32 comprises computer program code, which, when run on the network node 7 causes the network node 7 to:

establish a respective capacity parameter reflecting a capacity need within a respective area 14, 15 of at least two areas 14, 15 within the distributed antenna system 10, wherein a first area 14 is covered by a first antenna unit 8a and a second area 15 is covered by a second antenna unit 8b, and adapt an impedance of the two or more antenna units 8a, 8b based on the established capacity parameters for each respective areas 14, 15.

The computer program product, or the memory, thus comprises instructions executable by the processor. Such instructions may be comprised in a computer program, or in one or more software modules or function modules.

Figure 9:
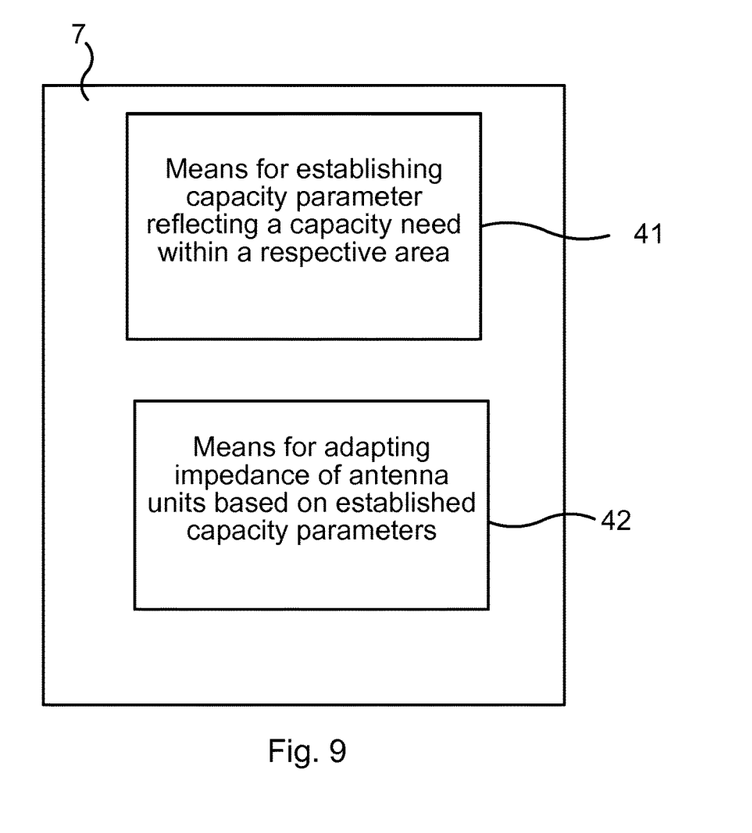
FIG. 9 illustrates a first network node comprising function modules/software modules for implementing embodiments of the methods of the present disclosure.

An example of an implementation using function modules/software modules is illustrated in FIG. 9, in particular illustrating network node 7 comprising function modules for implementing embodiments of the method of the present disclosure. The network node 7 comprises first means, for example a first function module 41, for establishing a respective capacity parameter reflecting a capacity need within a respective area of at least two areas within the distributed antenna system, wherein a first area is covered by a first antenna unit and a second area is covered by a second antenna unit. The network node 7 comprises second means, for example a second function module 42, for adapting an impedance of the two or more antenna units 8a, 8b based on the established capacity parameters for each respective areas.

The network node 7 may comprise still additional means, e.g. function modules, for performing the various features as have been described. For instance, the network node 7 may comprise means for establishing the respective capacity parameter reflecting a capacity need by determining a respective number of active communication devices 9 located within a respective area 14, 15.

The functional modules 41, 42 and any additional function modules can be implemented using software instructions such as computer program executing in a processor and/or using hardware, such as application specific integrated circuits, field programmable gate arrays, discrete logical components etc.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method in a network node of a wireless network for adapting capacity to capacity need, the wireless network comprising a distributed antenna system providing coverage for wireless communication for communication devices, wherein the distributed antenna system comprises a first antenna unit connected to the network node and a second antenna unit connected to the network node, the first antenna unit providing coverage for a first area and the second antenna unit providing coverage for a second area, the method comprising:

establishing a first capacity parameter reflecting a capacity need within the first area covered by the first antenna unit, establishing a second capacity parameter reflecting a capacity need within the second area covered by the second antenna unit, adapting an impedance of the first antenna unit based on the established first capacity parameter, and adapting an impedance of the second antenna unit based on the established second capacity parameter.

2. The method as claimed in claim 1, wherein establishing the first capacity parameter comprises determining a number of active communication devices located within the first area covered by the first antenna unit.

3. The method as claimed in claim 2, wherein
the first and second antenna units are connected to the network node via a cable, the cable being connected at a first end thereof to a first antenna port of the network node and at a second end thereof to a second antenna port of the network node, and
the step of determining the number of active communication device located within the first area comprises:
receiving, at the first and the second antenna ports of the network node, a signal from an active communication device, and
determining, based on a time difference of reception of the signal at the respective antenna ports, the antenna unit to which the active communication device is connected.

4. The method as claimed in claim 2, wherein
the first and second antenna units are connected to the network node via a cable, the cable being connected at a first end thereof to a first antenna port of the network node and at a second end thereof to a second antenna port of the network node, and
the step of determining the number of active communication device located within the first area comprises:
receiving, at the first and second antenna ports of the network node, a signal from an active communication device, and
determining, based on a difference in received signal strength between the signals as received at the respective antenna ports, the antenna unit to which the active communication device is connected.

5. The method as claimed in claim 2, wherein the step of determining the number of active communication device located within the first area comprises:
determining the antenna unit to which an active communication device is connected by changing the impedance for the first antenna unit and detecting transmission power changes for the active communication device in response to the impedance change.

6. The method as claimed in claim 5, wherein an antenna unit for which an active communication device lowers its transmission power for a reduced impedance mismatch or increases its transmission power for an increased impedance mismatch is determined to be serving the active communication device, the active communication device thus being located within the area covered by this antenna unit.

7. The method as claimed in claim 1, wherein establishing the first capacity parameter comprises determining, based on historical data for the first capacity parameter, changes of capacity need within the first area over a time period a period of time.

8. The method as claimed in claim 1, wherein adapting the impedance of the first antenna unit comprises dynamically changing the impedance of an impedance tuning network connected to the first antenna unit, thereby adapting the power radiated and absorbed at the first antenna unit.

9. The method as claimed in claim 1, wherein adapting the impedance of the first antenna unit comprises adapting the impedance individually for an uplink direction and downlink direction, respectively.

10. The method as claimed in claim 1, wherein
at least one of the capacity need within the first area and the capacity need within the second area reflects an expected capacity need; and
at least one of the first capacity parameter and the second capacity parameter is obtained from historical information.

11. A network node of a wireless network for adapting capacity to capacity need, the wireless network comprising a distributed antenna system (DAD) providing coverage for wireless communication for communication devices, wherein the distributed antenna system comprises a first antenna unit connected to the network node and a second antenna unit connected to the network node, the first antenna unit providing coverage for a first area and the second antenna unit providing coverage for a second area, the network node comprising:
a processor; and
a memory storing instructions that, when executed by the processor, causes the network node to:
establish a first capacity parameter reflecting a capacity need within the first area covered by the first antenna unit,
establish a second capacity parameter reflecting a capacity need within the second area covered by the second antenna unit,
adapt an impedance of the first antenna unit based on the established first capacity parameter, and
adapt an impedance of the second antenna unit based on the established second capacity parameter.

12. The network node as claimed in claim 11, wherein the network node is configured to establish the first capacity parameter by determining a number of active communication devices located within the first area covered by the first antenna unit.

13. The network node as claimed in claim 12, wherein the first and second antenna units are connected to the network node via a cable, the cable being connected at a first end thereof to a first antenna port of the network node and at a second end thereof to a second antenna port of the network node, and wherein the network node is configured to determine the number of active communication devices by:
receiving, at the first and the second antenna ports of the network node, a signal from an active communication device, and
determining, based on a time difference of reception of the signal at the respective antenna ports, the antenna unit to which the active communication device is connected.

14. The network node as claimed in claim 12, wherein the first and second antenna units are connected to the network node via a cable, the cable being connected at a first end thereof to a first antenna port of the network node and at a second end thereof to a second antenna port of the network node, and wherein the network node is configured to determine the number of active communication devices by:
receiving, at the first and second antenna ports of the network node, a signal from an active communication device, and
determining, based on a difference in received signal strength between the signals as received at the respective antenna ports, the antenna unit to which the active communication device is connected.

15. The network node as claimed in claim 12, configured to determine the number of active communication devices by:
determining the antenna unit to which an active communication device is connected by performing a determining process comprising changing the impedance for the first antenna unit and detecting transmission power changes for the active communication device in response to the impedance change.

16. The network node as claimed in claim 15, configured to determine an active communication device to be served by an antenna unit for which the communication device lowers its transmission power for a reduced impedance mismatch or increases its transmission power for an increased impedance mismatch, the active communication device thus being located within the area covered by this antenna unit.

17. The network node as claimed in claim 11, wherein the network node is configured to establish the first capacity parameter by performing a process comprising determining, based on historical data for the first capacity parameter, changes of capacity need within the first area over a time period.

18. The network node as claimed in claim 11, wherein the network node is configured to adapt the impedance of the first antenna unit by performing a process comprising changing the impedance of an impedance tuning network of the first antenna unit, thereby adapting the power radiated and absorbed at the first antenna unit.

19. The network node as claimed in claim 11, configured to adapt the impedance of the first antenna unit by adapting the impedance individually for an uplink direction and downlink direction, respectively.

20. A computer program product comprising a non-transitory computer readable medium comprising a computer program for a network node of a wireless network for adapting capacity to capacity need, the wireless network comprising a distributed antenna system providing coverage for wireless communication for communication devices, wherein the distributed antenna system comprises a first antenna unit connected to the network node and a second antenna unit connected to the network node, the first antenna unit providing coverage for a first area and the second antenna unit providing coverage for a second area, the computer program comprising computer program code, which, when run on the network node causes the network node to:

establish a first capacity parameter reflecting a capacity need within the first area covered by the first antenna unit, establish a second capacity parameter reflecting a capacity need within the second area covered by the second antenna unit, adapt an impedance of the first antenna unit based on the established first capacity parameter, and adapt an impedance of the second antenna unit based on the established second capacity parameter.

* * * * *